BRUCE K. NELSON
WILLIAM P. GOLDBERG
MAURICE B. HASLAM
INVENTORS

BY Alden D Redfield
Abraham Ogman
ATTORNEYS

SIGNAL SYNTHESIZER SYSTEM

Filed Feb. 23, 1960 4 Sheets-Sheet 2

BRUCE K. NELSON
WILLIAM P. GOLDBERG
MAURICE B. HASLAM
INVENTORS

BY Alden D Redfield
Abraham Ogman
ATTORNEYS

BRUCE K. NELSON
WILLIAM P. GOLDBERG
MAURICE B. HASLAM
*INVENTORS*

BY Alden D Redfield
Abraham Ogman
ATTORNEYS

SIGNAL SYNTHESIZER SYSTEM

BRUCE K. NELSON
WILLIAM P. GOLDBERG
MAURICE B. HASLAM
INVENTORS.
BY Alden D Redfield
Abraham Ogman
ATTORNEYS United States Patent Office 3,145,383
Patented Aug. 18, 1964

3,145,383

SIGNAL SYNTHESIZER SYSTEM

Bruce K. Nelson, Concord, William P. Goldberg, Woburn, and Maurice B. Haslam, Waltham, Mass., assignors to Avco Corporation, Cincinnati, Ohio, a corporation of Delaware Filed Feb. 23, 1960, Ser. No. 11,406
12 Claims. (Cl. 343—100)

This invention relates to a signal synthesizing system, and more particularly to a signal synthesizing system for controlling the direction in which an antenna array, comprising a plurality of radiators, transmits or receives radiated energy under optimum conditions. In a transmitter, the signal synthesizer system will control the direction in which a maximum electromagnetic field intensity is developed. In a receiver, the signal synthesizing system will electronically direct the antenna array in the direction of maximum field intensity; i.e., in the direction of a remote transmitter. The term "radiated signals" will, hereinafter, mean propagated maximum electromagnetic field intensity, transmitted or received. The direction in which the radiated signals are transmitted or received will be called the direction of propagation. For simplicity, a transmitting array will be considered in the detailed discussions that follow.

This invention relates to the subject matter of a co-pending application entitled, "Signal Synthesizing System," Serial No. 803,539, filed April 1, 1959. Two of the inventors of the present invention are applicants in the prior co-pending application; there is a common assignee.

In the aforementioned application there is described and claimed a signal synthesizing system for developing a plurality of fixed frequency phase related signals. There is also described and claimed transmitting and receiving means utilizing the phase related signals. The prior application, however, does not relate the phase to the physical arrangement of the radiating elements in the antenna array, nor does it describe a method of steering an antenna array having a specific arrangement of radiators.

It is an object of the present invention to provide a signal synthesizing system for controlling the direction, in azimuth and elevation, in which an antenna array transmits or receives radiated signals.

It is another object of the invention to provide a signal synthesizing system for controlling the direction in which an antenna array, comprising a random arrangement of radiators, transmits or receives radiated signals.

It is still another object of the invention to provide a signal synthesizing system for providing a plurality of phase related signals; the phase of an individual signal comprises a coefficient component which is a function of the arrangement of antenna radiating elements, and an angle component which is a function of the direction in which the antenna is to transmit or receive maximum radiated signals.

It is another object of the invention to provide a signal synthesizing system for providing a plurality of phase related signals for an antenna array comprising a plurality of radiating elements wherein a phase shifting network can be made to control the phase relationship of these signals through a single control means, the phase shifting network being constructed to provide a phase slope between output signals which is determined by the spacing between radiating elements to which the output signals are coupled.

It is yet another object of the invention to provide a signal synthesizing system for providing a plurality of phase related signals for a circular antenna array for controlling the direction in which the circular antenna array transmits or receives radiated signals.

The invention consists of a signal synthesizing system for controlling the direction of propagation, as represented by an angle of elevation $\phi$ and an angle of azimuth $\theta$, of an antenna array comprising a plurality of radiators in a predetermined arrangement with respect to a three dimensional coordinate system, having three mutually orthogonal axes, typically X, Y and Z. The signal synthesizing system includes signal generating means, one for each axis, for providing phase related signals, the phases of which are determined by the product of the distance in electrical radians represented by the coordinates of the radiators with respect to the axes and a function of $\phi$ and $\theta$. The product is obtained by coupling a variable frequency signal generator, the frequency of which is varied in accordance with a function of $\phi$ and $\theta$, to a phase shifting means having a plurality of output circuit means. The phase shifting means includes a fixed phase slope between adjacent output circuit means, the magnitudes of which are determined by the coordinates of the radiators to which they will be coupled.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

*Theory*

Figure 1:
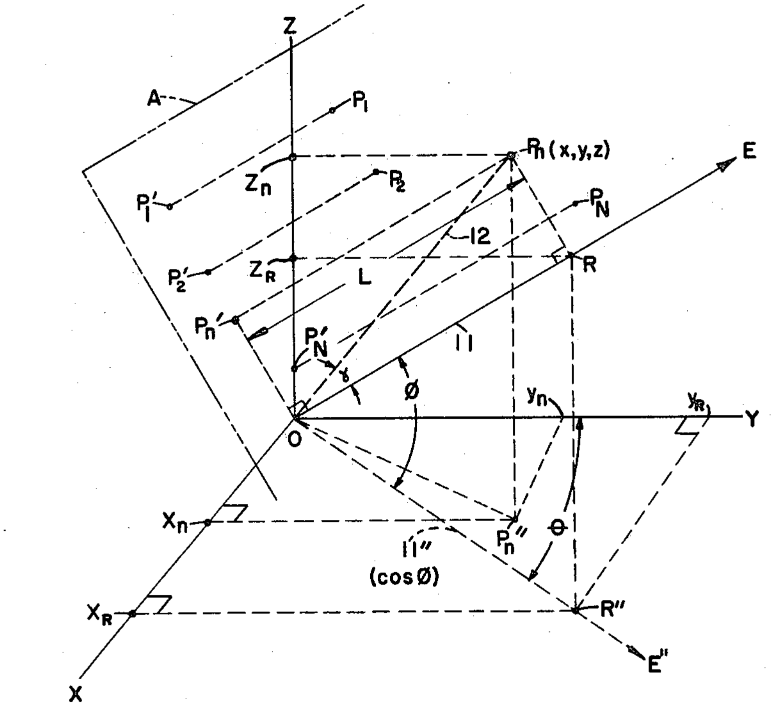
FIGURE 1 is a geometrical representation which is useful in explaining the invention.

Referring to FIGURE 1 of the drawings there is represented a plurality of radiators designated $P_1$–$P_N$ which make up an antenna array. The radiators are arranged in a random pattern in order that a relationship may be derived which will hold for any antenna configuration. Also depicted in FIGURE 1 is a three dimensional coordinate system containing the conventional mutually orthogonal axes X, Y and Z. The dash lines denote geometrical construction lines and are provided for clarity and to simplify the explanation of the system.

Let it be assumed that it is required to produce a maximum field intensity in the direction of the arrow "E", hereinafter called the propagation vector. For purposes of relating the propagation vector "E" to elevation and the azimuth, the direction of the propagation vector "E" is represented by an elevation angle, $\phi$, it makes with the X–Y plane, and an azimuth angle, $\theta$, that its projection on the X–Y plane, E″, makes with the Y axis.

As is well known, where the radiators are energized with in-phase currents, the phase of the signal radiated from a radiator $P_1$–$P_N$ with respect to a plane, "A" for example, perpendicular to the direction of radiation (propagation vector "E"), will be a function of the distance of that radiator, from the plane "A." To develop a maximum field intensity in the direction of the propagation vector "E," it is necessary to adjust the phase of the currents in the radiators $P_1$–$P_N$ so that their radiated fields are in phase at any arbitrary plane perpendicular to the propagation vector "E." To simplify the mathematical derivation to follow, it will be assumed that the phase of the radiated signals from the radiators $P_1$–$P_N$ are to be in phase on the aforementioned plane "A."

In FIGURE 1 the instantaneous field intensity at the $n$th radiator is governed by the following equation:

$$v_n = v'_n \sin(\omega t) \quad (1)$$

where:

$v'_n$ is a constant representing the field intensity at the $n$th radiator, $\omega t$ representing the frequency of the signal being radiated by a radiator.

The instantaneous field intensity, $v_{an}$, on the plane "A" due to the $n$th radiator equals $$v'_{an} \sin\left(\omega t - \frac{2\pi L}{\lambda}\right) \quad (1A)$$

where:

$v'_{an}$ is a constant representing the field intensity on the plane "A" due to the $n$th radiator and $$\frac{2\pi L}{\lambda}$$

is the distance of the $n$th radiator from the plane "A" in electrical radians.

If we assume that plane "A" passes through the origin "O" of the coordinate system, the electrical distance of the $n$th radiator from the plane "A" represents the phase between the radiated signal from the $n$th radiator and the phase of a signal developed by a radiator placed at the origin "O." Thus, Equation 1A demonstrates that to assure an in-phase relationship of signals reaching plane "A" from all of the radiators $P_1$–$P_N$ it is necessary to adjust the phases of these signals in the radiators in relation to the distance from plane "A." Referring to FIGURE 1, it is seen that the distance "L" is equal to the length of the line joining the origin and the point "R" on the propagation vector "E." This line carries the symbol 11. It is also seen from the geometry that the length of the line 11 equals $$L = OP_n \cos\gamma \quad (2)$$

where:

$OP_n$, designated 12, is the distance of the $n$th radiator from the origin, and $\gamma$ is the angle between the line 12 and the propagation vector "E." The length of the line 11, and consequently the length L, can be determined as follows.

Assuming for the moment that the line 11 is a unit vector, it is clear that its projection 11'' equals the cos $\phi$. It is well to state, at this point, that the projections of radiators and points onto the X–Y plane carry a double prime ('') of the original point or radiator designation. Furthermore, projections onto plane "A" carry a single prime ('). Continuing the derivation, it is clear from the geometric relationships shown in FIGURE 1 that the "Y" projection designated $y_R$ of line 11 equals $(\cos\phi)(\cos\theta)$. Similarly, the "X" projection, designated $x_R$, equals $(\cos\phi)(\sin\theta)$. The "Z" projection, $z_R$ equals $\sin\phi$. It should be obvious to one skilled in the art that the direction cosines of the line 11 with respect to the X, Y and Z axes in terms of the angles $\phi$ and $\theta$ are $$X;\ \cos\phi \sin\theta \quad (3)$$

$$Y;\ \cos\phi \cos\theta \quad (4)$$

$$Z;\ \sin\phi \quad (5)$$

Referring now to the radiator $P_n$ and line 12 it will be seen that the direction cosines of line 12 comprise the X, Y, and Z coordinates of the radiator $P_n$. These have been designated $x_n$, $y_n$, and $z_n$ respectively. The cosine of the angle $\gamma$, following a well known analytical geometric relationship, is a function of the direction cosines of the lines 11 and 12 and equals $$\cos\gamma = (x_n \cos\phi \sin\theta + y_n \cos\phi \cos\theta + z_n \sin\phi) \quad (6)$$

From Equation 2 it follows that the length of the line 11 in electrical radians equals $$\psi_n = \frac{2\pi L}{\lambda}(x_n \cos\phi \sin\theta + y_n \cos\phi \cos\theta + z_n \sin\phi) \quad (7)$$

$\psi_n$ being in electrical radians also denotes phase angle.

Substituting for $\lambda$, $$\frac{f}{c}$$

Equation 7 becomes $$\psi_n = \frac{2\pi f L}{c}(x_n \cos\phi \sin\theta + y_n \cos\phi \cos\theta + z_n \sin\phi) \quad (7A)$$

where:

$f$=frequency of the radiated signal
$c$=velocity of propagation.

It will be noted that $\psi_n$ has been determined in terms of known parameters namely, the required elevation $\phi$ and the required azimuth $\theta$ of the propagation vector "E," and the physical position of the radiator in terms of its $x$, $y$ and $z$ coordinates.

It will also be noted from Equations 7 and 7A that the phase angle $\psi_n$ is made up of the sum of three terms, each of which can be considered a separate phase angle, and each of which contains a portion, which we shall call an angle portion that is a function of the angles $\theta$ and $\phi$—the direction of the propagation vector "E"—and a second portion, which we shall call a coefficient, that is a function of the position of radiator—X, Y, and Z in the antenna array.

*Signal Synthesizer Theory*

It is the purpose of this discussion to disclose a novel means for developing a series of phase related signals for the radiators of the FIGURE 1 antenna array. The phase related signals will control the direction in which the array will transmit or receive radiated signals. More particularly, this invention comprehends the provision of generating the phase related signals by utilizing phase shifting means which develops suitable phase related signals.

Before discussing the arrangement of the phase shifting networks, it will be shown that a phase shifting network can be constructed and controlled to provide a plurality of phase related signals which correspond in form to the phase angles shown in Equation 7A. In this connection, reference is made to the block representation of two circuit components shown in FIGURE 2. The two circuit components comprise a variable frequency signal generator 16 and a phase shifting network 17. The variable frequency signal generator includes an input terminal 18 coupled to a control signal (source not shown). An output terminal of variable frequency signal generator 16 is coupled to an input terminal of the phase shifting network 17. Also included in the phase shifting network 17 are a plurality of output terminals, designated serially, 1 through N. The output terminals carry the same numbers as those applied to the subscripts identifying the individual radiators. This was done in order to avoid confusion, since it will be shown hereinafter that the output terminals will be coupled to like numbered radiators.

The control signal may be derived from any electrical or manual means for varying the frequency of the signal generated by the signal generator 16. The form it will take will depend, largely on which of the many well known signal generators is used. For example, if generator 16 is a reactance tube oscillator, it is controlled by a D.C. voltage, the control device may be a rheostat connected to a source of D.C. voltage.

The phase shifting network 17 may comprise a tapped delay line, a tapped transmission line, or a plurality of phase shifting networks, connected serially or in parallel. In general, any phase shifting network having a fixed, but not necessarily equal, phase slope between its adjacent output terminals will be suitable for the present invention.

Typically, a delay line is uniformly constructed and a signal will vary in phase directly as a function of the length of the line. The phase at a tap relative to the phase at the input to the delay line is governed by the following relationship $$\psi_n = -\frac{2\pi l_n f}{C_c} \qquad (8)$$

where:

$l_n$ is the length of the delay line between the input and the tap under consideration,
$C_c$ is the phase velocity of the delay line, and
$f$ is the frequency of the signal applied to the delay line.

Thus, if we let $$\frac{2\pi l_n}{C_c}$$

equal the phase slope, or coefficient component, and allow "$f$" to represent the angle component, it is obvious that a phase shifting network can be used to provide the phase related signals, the phase angles of which will correspond to the phase angles in the bracketed portion of Equation 7A.

There is no requirement that the taps be located linearly along the length of the delay line. Accordingly, by judiciously locating the taps on the delay line, it is possible to construct unequal, but fixed phase slopes between output terminals of a phase shifting network.

Figure 2:
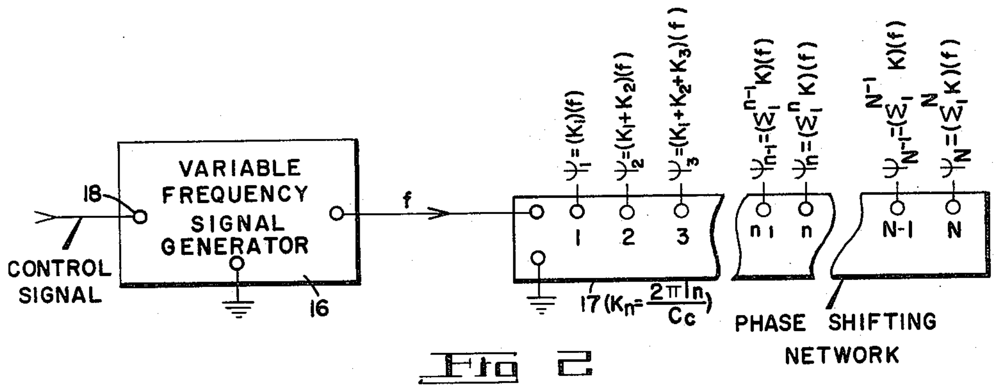
FIGURE 2 is a block diagram showing two circuit components used in the signal synthesizing system, including mathematical descriptive matter which is useful in explaining the operation of the invention.

In FIGURE 2 there is shown a number of output signals obtained from terminals 1–N of a tapered delay line. The phase slopes between adjacent terminals have been arbitrarily assigned and designated by the symbol K with a subscript. It follows, from FIGURE 2, therefore, that the phases of the signals derived from the $n$th tap on the phase shifting network 17 are governed by $$\psi_n = -\sum_{n=1}^{n} (K_n)(f) \qquad (9)$$

where:

$K_n$ is the phase slope between the ($n$—1)th and $n$th output terminals.

Figure 3:
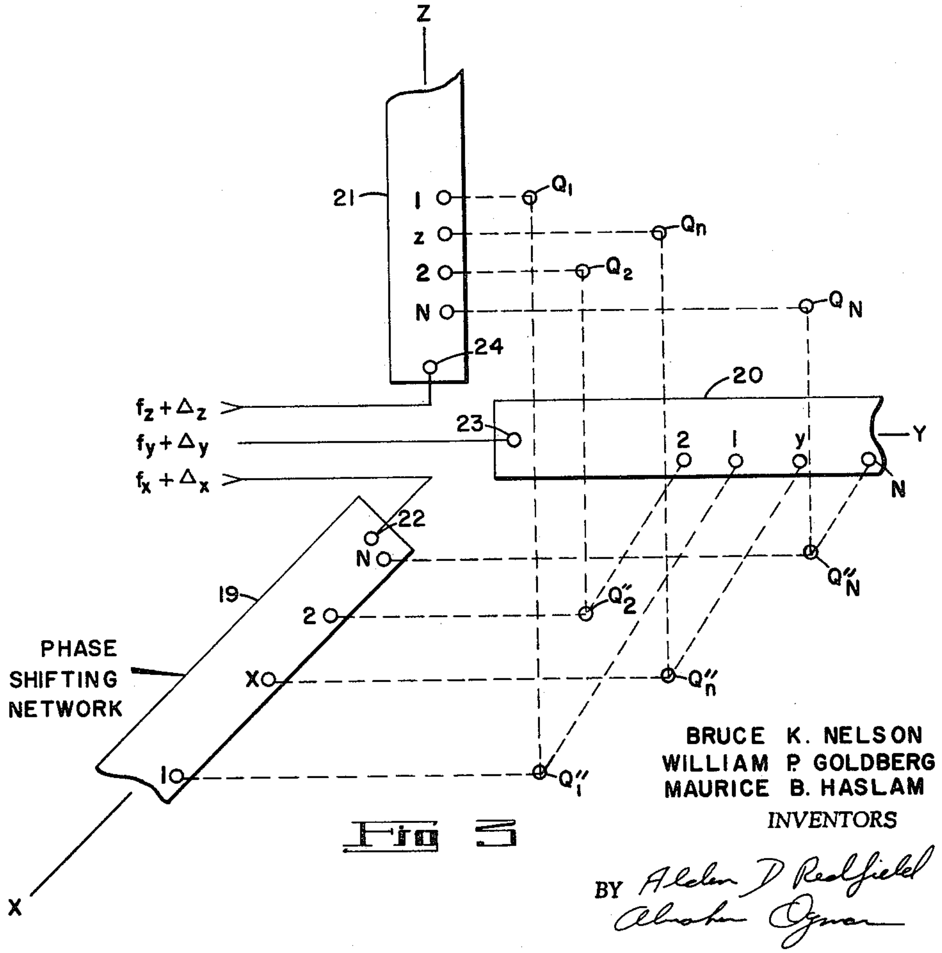
FIGURE 3 is a schematic representation of a three dimensional phase shifting network arrangement for implementing the novel concepts embodied in the invention.

It is now proposed to demonstrate how the circuits just discussed can form a phase shifting means for generating phase related signals suitable for the FIGURE 1 array and in accordance with Equations 7 and 7A. In FIGURE 3 of the drawings there are shown three phase shifting networks 19, 20 and 21. The phase shifting networks 19–21 have been constructed on the X, Y and Z axes, merely to simplify this discussion. Let it be assumed that the phase shifting networks 19–21 are tapped delay lines, having input terminals 22, 23 and 24 which are coupled to variable frequency signals generators, (not shown). The frequencies of the signals derived from these generators comprise a fixed center frequency "$f$", plus a differential or variable frequency Δ. Δ can be either positive or negative.

The location of the various taps on the phase shifting networks may be determined as follows. A number of points, designated $Q_1$–$Q_N$ have been constructed relative to the phase shifting networks. The spatial relationship between the "Q" points is identical, on a reduced scale, to the spatial relationship between the radiators $P_1$–$P_N$ in FIGURE 1. The taps on the phase shifting networks 19–21 represent the X, Y and Z projections of the "Q" points, and consequently correspond to the $x$, $y$ and $z$ coordinates of the "Q" points.

Continuing this discussion by considering the point $Q_n$, it is seen from FIGURE 3 that each of the projections of the point $Q_n$ on the X, Y and Z axes has been made to coincide with a tap on the corresponding phase shifting network 19–21. These taps have been designated $x_n$, $y_n$ and $z_n$. Thus, from Equation 8 it is seen that the phases of the signals derived from the phase shifting networks 19–21 at taps $x_n$, $y_n$ and $z_n$ relative to the origin zero are as follows:

$$\psi x_n = -\frac{2\pi x_n}{C_c}(f_x + \Delta_x) \qquad (10)$$

$$\psi_{yn} = -\frac{2\pi y_n}{C_c}(f_y + \Delta_y) \qquad (11)$$

$$\psi z_n = -\frac{2\pi z_n}{C_c}(f_z + \Delta_z) \qquad (12)$$

Adding Equations 10, 11 and 12 to find $\Psi Q_n$ $$\psi Q_n = \frac{2\pi}{C_c}(x_n f_x + y_n f_y + z_n f_z) + \frac{2\pi}{C_c}(x_n \Delta_x + y_n \Delta_y + z_n \Delta_z) \qquad (13)$$

(It will be shown hereinafter that means exist for accomplishing the addition of phases.)

It will be recalled that the signals applied to the input terminals 22–24 of the phase shifting networks 19–21 respectively, are derived from a variable frequency signal generator. It is a simple matter to provide a suitable control for these variable frequency signal generators such that the change in frequency will be a function of $\phi$ and $\theta$. More specifically, they can be controlled so that $$\Delta_x = H \cos\phi \sin\theta \qquad (14)$$
$$\Delta_y = H \cos\phi \cos\theta \qquad (15)$$
$$\Delta_z = H \sin\phi \qquad (16)$$

where:

H is a proportionality constant-dimensionally frequency.

Substituting 14, 15, and 16 in Equation 13 the following relationship results $$\psi_n = \frac{2\pi}{C_c}(x_n f_x + y_n f_y + z_n f_z) + \frac{2\pi H}{C_c}(x_n \cos\phi \sin\theta + y_n \cos\phi \sin\theta + z_n \sin\phi) \qquad (17)$$

It will be noted that the second term of the right hand member of Equation 17 is identical in form to the right hand member of Equation 7A. The first term of the right hand member of Equation 17 constitutes a constant phase angle since, it will be recalled, $f_x$, $f_y$ and $f_z$ are constant center frequencies about which the frequency of the delay line input signal is varied. It will be shown hereinafter that this constant phase angle may be compensated for by passing the phase related signals through phase correction networks. The right hand member of Equation 17 can be made identical to the right hand member of Equation 7A by a suitable choice of design parameters.

Thus, in the foregoing discussion it has been shown that a signal synthesizing system containing one or more phase shifting means can be made to develop phase related signals suitable for controlling the direction in an antenna array made up of arbitrarily spaced radiators.

*Signal Synthesizing System for a Circular Array*

One useful arrangement of radiators in an antenna array is a circular arrangement, wherein the radiators generate a circumference of a circle. To simplify this discussion the illustrated embodiment will cover a signal synthesizing system which will be described for controlling the direction of the propagation vector "E" of the circular array. It is emphasized that the following discussion regarding the circular array is not a limitation on the invention but merely an attempt to describe one particular embodiment of the invention which can be described simply.

Figure 4:
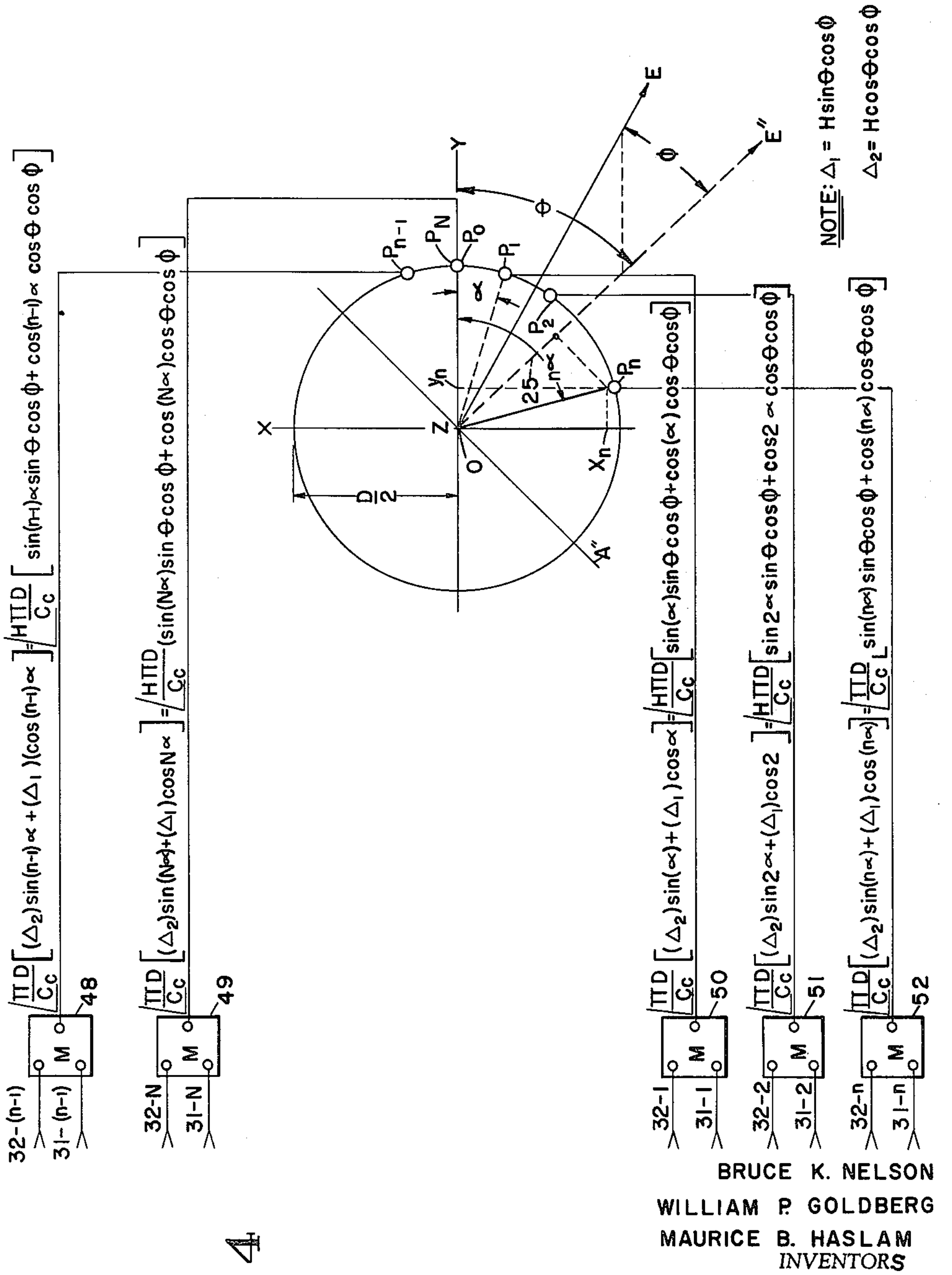
FIGURE 4 is a schematic representation of a circular array.

Referring to FIGURE 4 of the drawings there is shown a circular array comprising radiators $P_1$–$P_N$. The radiators on the circle are separated by angular increments "$\alpha$" as indicated. Accordingly, the angle between the Y axis and the radiator $P_n$ is equal to $n\alpha$. Continuing with the now familiar procedure, the X and Y projections of $P_n$, designated $x_n$, $y_n$, equal $$x_n=\frac{D}{2}\sin n\alpha \tag{18}$$

$$y_n=\frac{D}{2}\cos n\alpha \tag{19}$$

where $$\frac{D}{2}$$

is equal to the radius of the generating circle.

It is also clear from the geometry that the distance of the point $P_n$ from a line A″ perpendicular to the propagation vector "E" and passing through the origin "O," designated 25 is equal to $$\frac{D}{2}\cos(\theta-n\alpha)\cos\phi \tag{20}$$

Expanding Equation 20 and making suitable substitutions for converting Equation 18 to electrical radians (phase angle) the following is found $$\psi P_n=-\frac{2\pi D}{\lambda 2}(\sin n\alpha\sin\theta\cos\phi+\cos n\alpha\cos\theta\cos\phi) \tag{21}$$

$$\psi P_n=-\frac{2\pi F}{C}(\sin n\alpha\sin\theta\cos\phi+\cos n\alpha\cos\theta\cos\phi)\frac{D}{2} \tag{21A}$$

Equations 21 and 21A represent the phase relationship required of the signals applied to the radiators in a circular array for controlling the direction of the propagation vector "E." The minus sign in Equations 21 and 21A represents that the phase of the signal in the radiator $P_n$ is to be delayed with respect to zero phase at the center of the array, provided the term in the parenthesis is positive. It will also be noted that $$\frac{D}{2}(\cos\theta)(\cos\phi)$$

represents the horizontal component and $$\frac{D}{2}(\sin\theta)(\cos\phi)$$

the Y component of the radius $OP_n$. It is obvious that they also represent the coordinates of the radiator $P_n$.

Where the zero phase reference point is taken at a point other than the center of the array, the form of Equation 21 will change by one or more constants associated with the sin $n\alpha$ or cos $n\alpha$ terms. For example, if zero phase is assumed to be at $P_N$, the right hand term in Equations 21 and 21A become $(\cos n\alpha-1)\cos\theta\cos\phi$.

Since the circular array is a special case of the general array previously discussed, it should be possible to show that Equation 7 can be made to equal Equation 21. It is obvious that for the circular array under consideration the angle $\phi$ is equal to zero and by substituting for $x_n-y_n$ in Equation 7, the relationship determined in Equations 18 and 19, it is seen that Equation 7 reduces to Equation 21 or Equation 21A.

Figure 4A:
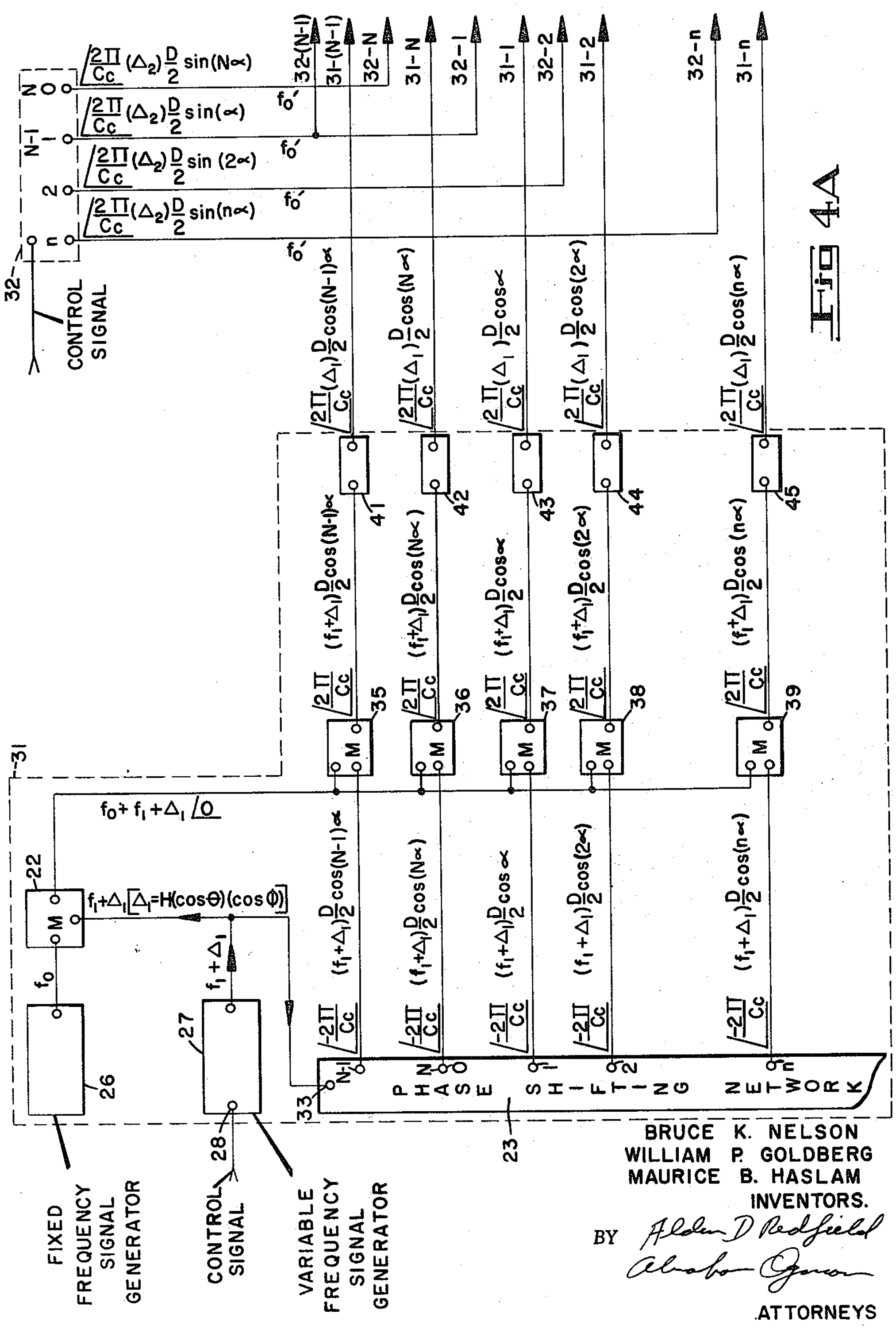
FIGURE 4A is a block representation of steering circuitry for the FIGURE 4 circular array.

The signal synthesizer is shown in FIGURE 4A and comprises signal generating means, for producing a plurality of phase related signals and mixing means for intermodulating the phase related signals for producing output signals which are coupled to the radiators in the circular array. Signals generated by the synthesizer in FIGURE 4A are coupled to the circular array in FIGURE 4 through like-numbered output and input terminals respectively.

Since we are considering a planar array only two signal generating means are required and these are included in the dotted outlines 31 and 32. Also, since the circuit elements that make up the signal generating means 31 and 32 are similar, only the description and operation of the signal generating means 31 will be discussed.

The signal generating means 31 includes a fixed frequency signal generator 26, a crystal control oscillator for example, for developing fixed frequency signals. If desired, signal generating means 31 and 32 may make use of a common fixed frequency generator. The frequency of the signal developed in the fixed frequency signal generator 26 is designated $f_0$. The counterpart in signal generating means 32 will be a signal at frequency $f_0'$.

The signal generating means 31 also includes a variable frequency signal generator 27, whose frequency may be accurately controlled by a control signal applied to an input terminal 28. Since the variable frequency signal generator 27 may take the form of a reactance tube oscillator or a Varicap oscillator, both very well known in the art, it is not necessary to describe this circuit component in detail. The variable frequency signal generator 27 produces an output signal, the frequency of which can be made to vary about the center frequency $f_1$ by an increment $\Delta$. See FIGURE 4. Where, as in this instance, it is desired to steer a circular array, $\Delta$ is made proportional to $(\cos\theta)(\cos\phi)$.

Similarly, the control signal applied to the signal generating means 32 will control the variable frequency signal generator included therein. However, the frequncy variation thereof will be determined by $(\sin\theta)(\cos\phi)$.

Mixing mans 22 is provided for intermodulaing the signals applied by the fixed frequency generator 26 and the variable frequency generator 27. A modulation signal is developed as a result. The mixer 22 may take the form of any well known modulation means appropriate to the operating frequency. In fact, all of the mixers shown in FIGURE 4 are similar in their design and their mode of operation. A detailed description is not required because of their conventional nature.

The signal generating means 31 also includes the phase shifting network 23 for developing phase shifted signals at the frequency of the signal applied to an input terminal 33. For purposes of illustration, the phase shifting network 23 shall be considered to be a tapped delay line. The taps are numbered to correspond with the numbers of the radiators in the circular array, to which the signal obtained therefrom will be eventually coupled. The phase slopes between the input to the phase shifting network 23 and the taps are determined by the location of the radiator to which the tap will be coupled. In this instance, the phase slopes are equal to the horizontal distance in electrical radians from the center of the array to the radiator. Considering the radiator $P_n$ for example, this distance will be proportional to Cos $n\alpha$ and on the basis of the assumed coordinate system will correspond to the X coordinate of the $P_n$ radiator.

The signal generating means 31, also includes a plurality of mixers 35–39 for intermodulating the phase shifted signals from the phase shifting network 23 with the modulated signal derived from the mixer 22. The signals developed in mixers 35–39 are each coupled through phase correction networks 41–45 to a plurality of antenna mixers 48–52 (FIGURE 4).

Signals generated in the signal generating means 32 are also applied to mixers 48–52. The output signals resulting from the intermodulation in mixers 48–52 are coupled to the radiators as indicated in FIGURE 4.

*Operation of the FIGURES 4 and 4A System*

Referring to FIGURE 4A of the drawings assumed frequencies of the signals obtained from the variable frequency elements and the phases of these signals have been included in the drawings in the conventional shorthand notation to facilitate the understanding of the signal synthesizing system. Signals are identified by an "$f$" and a subscript, where the designation denotes the frequency of the signal as well. Although the frequency $f_1+\Delta_1$ will vary through a band of frequencies as the phase relationship of the phase shifted signals is varied, for purposes of this discussion it will be assumed that the variable frequency signal generator 27 is adjusted to a specific frequency $f_1+\Delta_1$ thus providing a preselected phase relationship for the phase shifted signals. It will be noted that $\Delta_1$ is proportional to $(\cos\theta)(\cos\phi)$ indicating that the change in frequency about the center frequency $f_1$ is determined by the direction of propagation.

In discussing the operation of the circular array system, it will be assumed that it is desired to radiate in the direction of the vector "E," $\theta$ radians from the Y axis and $\phi$ radians in elevation. Initially, control signals are coupled to the signal generating means 31 and 32 and the variable frequency signal generators included therein are tuned to frequencies which are determined by $(\cos\theta)(\cos\phi)$ and $(\sin\theta)(\cos\phi)$ respectively. In FIGURE 4A the frequency obtained from the variable frequency signal generator 27 has been designated $f_1+\Delta_1$.

The signal generator means 31 will be used to describe the sequence of events starting with a control signal and leading up to the development of the fixed frequency phase related signals that are coupled to the antenna mixers 48–52, it being understood that signal generating means 32 functions similarly. The $f_1+\Delta_1$ signal and the $f_0$ signal, derived from the fixed frequency signal generator, are intermodulated in mixer 22 and the sum frequency, $f_0+f_1+\Delta_1$ is obtained therefrom. The sum frequency is coupled to one input circuit means of mixers 35–39.

The $f_1+\Delta_1$ signal is also coupled to the input terminal 33 of the phase shifting network 23 and its phase is modified, as the signal traverses the delay line. By substituting for $l_n$, $$\frac{D}{2}\cos n\alpha$$

and for $f$, $f_1+\Delta_1$ in Equation 8 the phase of the signal at the $n$th tap, relative to the phase at the center of the delay line, equals $$-\frac{2\pi}{C_o}(\cos n\alpha f_1+\cos n\alpha\Delta_1)\frac{D}{2} \qquad (22)$$

The phase shifting network 23 thus provides a plurality of phase shifted signals, at frequency $f_1+\Delta_1$, the phases of which are determined by, (1) the radiator arrangement or $\cos n\alpha$, and (2) the direction of the propagation vector "E" and $\Delta_1$ is controlled to be equal to $H(\cos\theta)(\cos\phi)$. The phase shifted signals are coupled as shown to mixers 35–39 where they are intermodulated with the sum signal $f_0+f_1+\Delta_1$. The fixed frequency difference signal "$f_0$" is excluded by filtering in the output and the phases of this fixed frequency difference signal bear the same relationship to each other, as the phase relationship of the phase shifted signals from which they were derived except for a change of sign because of the choice of lower side bands in the mixer output. The fixed frequency difference signals are then coupled through the phase correction networks 41–45 placed in their signal path. The phase correction networks 41–45 are phase shifting devices which modify the phase of the fixed frequency signals coupled thereto by an amount equal to the left hand term of Equation 22. In effect, a phase subtraction has taken place so that the signals leaving the phase correction networks 41–45 have phases that are determined solely by the right hand term in Equation 22.

In a similar sequence of events a second plurality of fixed frequency phase related signals are obtained from the signal generator means 32. In this case, however, the phases of these signals are functions of $\sin n\alpha$ and $(\sin\theta)(\cos\phi)$. As noted in FIGURE 4A these signals have been assigned a frequency $f_0'$.

The fixed frequency signals from signal generating means 31 and 32 are coupled to the antenna mixers 48–52 where they are intermodulated and the sum signal selected at the output of these mixers. Accordingly, the output signals from the antenna mixers 41–52 have a frequency of $f_0+f_0'$ and phase angles which comprise the sum of the phase angles of the intermodulated fixed frequency signals. See FIGURE 4. It will be noted that the phase angles are determined by the following relationship $$\psi_n=-\frac{\pi DH}{C_o}(\cos n\alpha\cos\theta\cos\phi+\sin n\alpha\sin\theta\cos\phi) \qquad (23)$$

The sole difference between Equation 23 and Equations 21 is the constant multiplier; by the proper choice of design parameters, H, $l$ and $C_o$, these relations can be made identical.

Where the circular array is to be used as an end fire array, that is the direction of propagation lies in the plane of the array, $\cos\phi$ becomes unity and Equation 23 reduces to $$\psi_n=-\frac{\pi DH}{C_o}(\cos n\alpha\cos\theta+\sin n\alpha\sin\theta) \qquad (24)$$

This invention also comprehends by adding a third steering line, the use of circular arrays stacked one above the other in a cylindrical configuration since the principles previously described for the random array and for the circular array can be modified slightly to accommodate a "cylindrical array."

Figure 5:
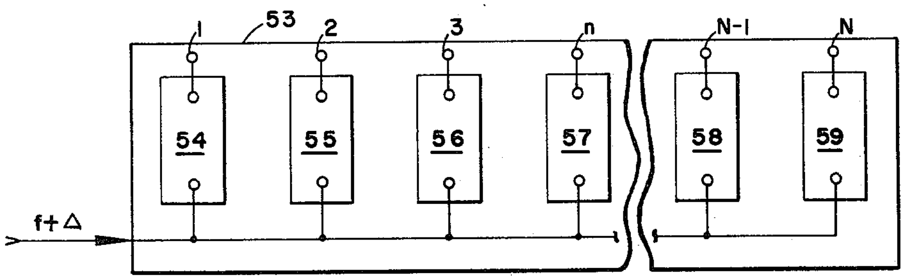
FIGURE 5 shows an alternative form of phase shifting network.

In FIGURE 5 of the drawings there is shown an alternative form of phase shifting network 53 comprising a plurality of individual phase shifting circuits 54–59. The input circuits of the phase shifting circuits are tied together and coupled to a variable frequency signal generator (not shown). The output circuit means 1 through N would be coupled to mixers 35–39. In this case the phase shifting circuits comprise a separate and distinct phase slope which is independent of the phase slope associated with an adjacent output circuit means. This is because the phase shifting networks can be so designed as to have zero phase shift at the center frequency $f$ (or $f'$), while at the same time possessing the correct various phase slopes. In the alternative the phase shifting circuits may be series connected.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A signal synthesizing system for controlling the direction of propagation of an antenna array comprising a plurality of radiators in a predetermined arrangement with respect to a three dimensional coordinate system having a plurality of axes comprising: means for developing phase related signals, the phase angles of which are determined by the product of the direction cosines, with respect to each of the axes of the coordinate system, of two vectors, one extending from the origin of the coordinate system to the radiators and the other extending from the origin in the direction of propagation; and means for intermodulating phase related signals associated with each axis for developing output signals having phase angles which are determined by a function of the phase angles of the intermodulated phase related signals.

2. A signal synthesizing system for controlling the direction of propagation of an antenna array comprising a plurality of radiators in a predetermined arrangement with respect to a three dimensional coordinate system having a plurality of axes comprising: means for developing fixed frequency phase related signals, the phase angles of which are determined by the product of the direction cosines, with respect to each of the axes of the coordinate system, of two vectors, one extending from the origin of the coordinate system to the radiators and the other extending from the origin in the direction of propagation; and means for intermodulating said fixed frequeniy phase re-lated signals associated with each axis for developing output signals having phase angles which are determined by a function of the phase angles of the intermodulated fixed frequency phase related signals.

3. A signal synthesizing system for controlling the direction of propagation of an antenna array comprising a plurality of radiators in a predetermined arrangement with respect to a three dimensional coordinate system, typically having orthogonal axes, comprising: means for developing a plurality of fixed frequency phase related signals, the phase angles of which are determined by a constant phase angle component defined by the radiator arrangement and a variable phase angle component, the variation of which being determined by the direction cosines of a vector extending from the origin in the direction of propagation; means in the signal path of each of the fixed frequency phase related signals for modifying the phase of said signals for removing the constant phase angle component thereof; and means for intermodulating the variable phase angle component for developing output signals, the phases of which are determined by the phase angles of the intermodulated signals.

4. A signal synthesizing system for controlling the direction of propagation of an antenna array comprising a plurality of radiators in a predetermined arrangement with respect to a three dimensional coordinate system having a plurality of axes comprising: variable frequency generating means associated with each of the axes for developing variable frequency signals, the frequency variation of which is determined by the direction cosines of a vector extending from the origin of the coordinate system in the direction of propagation; phase shifting means associated with each axis having input circuit means and a plurality of output circuit means, the phase slope between the input circuit means and the output circuit means being determined by the direction cosines of a vector connecting the origin of the coordinate system and a radiator, said phase shifting means being coupled to said variable frequency signal generating means for developing a plurality of phase shifted signals, the phases of which are a product of the aforementioned direction cosines taken with respect to an axis; means, including intermodulating means, associated with each axis for converting the phase shifted signals to fixed frequency phase related signals for each axis without modifying the phase relationship established in the phase shifted signals; and means for intermodulating the fixed frequency signals associated with each axis for developing output signals having phase angles which are determined by the phase angles of the intermodulated fixed frequency signals.

5. A signal synthesizing system for controlling the direction of propagation of an antenna array comprising a plurality of radiators in a predetermined arrangement with respect to a three dimensional coordinate system having a plurality of axes comprising: variable frequency generating means associated with each of the axes for developing variable frequency signals, the frequency variation of which is defined by the direction of propagation; phase shifting means associated with each axis having an input circuit means and a plurality of output circuit means, the phase slope between the input circuit means and the output circuit means being determined by the arrangement of the radiators with respect to the coordinate system, said phase shifting means being coupled to said variable frequency signal generating means for developing a plurality of phase shifted signals associated with an axis; means including intermodulating means for converting the phase shifted signals taken with respect to an axis to fixed frequency phase related signals associated with the same axis without modifying the phase relationship established in the phase shifting signals; and means for intermodulating the fixed frequency signals for developing output signals having phase angles which are defined by the phase angles of the intermodulated fixed frequency signals.

6. A signal synthesizing system as described in claim 5 in which each phase shifting means comprises a tapped signal translating line having a uniform delay per unit of length, the taps being spaced along the length thereof and their relative spacing being determined by the relative spacing of the radiators.

7. A signal synthesizing system as described in claim 5 in which each phase shifting means comprises a phase shifting network including a plurality of phase shifting circuits each of which is connected between the input circuit means and an output circuit means.

8. A signal synthesizing system for controlling the direction of propagation as represented by an angle of elevation $\phi$ and an angle of azimuth $\theta$ of an antenna array comprising a plurality of radiators in a predetermined arrangement with respect to a three dimensional coordinate system having three mutually orthogonal axes, typically X, Y and Z, and a zero phase reference plane passing through the origin of the coordinate system comprising: means for developing a plurality of phase related fixed frequency signals, the phase angles of which are determined by the product $x_n$ $(\cos\theta)$ $(\cos\phi)$; means for developing a plurality of phase related fixed frequency signals, the phase angles of which are determined by the product $y_n$ $(\sin\theta)(\cos\phi)$; means for developing a plurality of phase related fixed frequency signals, the phase angles of which are determined by the product $z_n$ $(\sin\phi)$; and means for intermodulating the fixed frequency signals associated with a radiator for developing output signals having a phase which comprises a function of the phase angles of the fixed frequency phase related signals.

9. A signal synthesizing system for an antenna having a circular array angularly spaced radiators for controlling the direction of propagation of the array in azimuth $\theta$ and elevation $\phi$ comprising: means for developing a plurality of fixed frequency phase shifted signals, the phase relationship of these signals being determined by the product of a cosine function of the angular spacing of the radiators, a cosine function of azimuth $\theta$ and the cosine of elevation $\phi$; means for developing a second plurality of fixed frequency phase shifted signals, the phase relationship of these signals being determined by the product of a sine function of the angular spacing of the radiators, a sine function of azimuth $\theta$ and a cosine function of elevation $\phi$; and means responsive to the first and second plurality of fixed frequency phase shifted signals for developing output signals, the phase relationship of which is a function of the phases of the first and second fixed frequency phase shifted signals.

10. A signal synthesizing system for an antenna having a circular array of angularly spaced radiators in a predetermined arrangement with respect to a three dimensional coordinate system, typically X, Y and Z axes, for controlling the direction of propagation of the array in azimuth $\theta$ and elevation $\phi$ comprising: first and second fixed frequency generating means; a first variable frequency generating means associated with each of the axes for developing a variable frequency signal, the frequency variations of which are determined by (a cosine function of $\theta$) (a cosine function of $\phi$); a second variable frequency generating means associated with each of the axes for developing variable frequency signals, the frequency variation of which is determined by (a sine function of $\theta$) (a cosine function of $\phi$); first and second phase shifting means each having a plurality of output circuit means, the arrangement of these output circuit means being such that the phase relationship of the signals derived therefrom are determined by a cosine function and a sine function of the angular spacing respectively, said first and second phase shifting means being coupled to the first and second variable frequency generators respectively for developing a first and second plurality of phase shifted signals, the phase relationships of the first plurality of phase shifted signals being determined by the relationship constant+(a cosine function of the angular spacing) (a cosine function of $\theta$) (a cosine function of $\phi$), the phase relationship of the second plurality of phase shifted signals being determined by the relationship constant+(a sine function of the angular spacing) (a sine function of $\theta$) (a cosine function of $\phi$); means coupled to the first and second fixed frequency generators and the first and second phase shifting means for developing a first and a second plurality of fixed frequency phase shifted signals having the same phase relationship as the first and second plurality of phase shifted signals respectively; first and second phase correction means in the signal path of the first and second fixed frequency phase shifted signals for modifying the phases of the fixed frequency phase shifted signals for removing said constants; and means responsive to the first and second modified fixed frequency phase shifted signals for developing output signals, the phase relationship of which is a function of the first and second modified fixed frequency phase shifted signals.

11. A signal synthesizing system for an antenna having a circular array of radiators angularly spaced, $\alpha$ radians, about the origin of a three dimensional coordinate system, typically X, Y, and Z axes, for controlling the direction of propagation of the array in azimuth $\theta$ and elevation $\phi$ comprising: first and second fixed frequency generating means; a first variable frequency generating means associated with an axis for developing a variable frequency signal, the frequency of which varies in accordance with the relationship $f_1+H_1$ (cos $\theta$) (cos $\phi$) where $f_1$ is a constant frequency and $H_1$ is a proportionality constant; a second variable frequency generating means associated with a second axis for developing variable frequency signals, the frequency of which varies in accordance with the relationship $f_2+H_2$ (sin $\theta$) (cos $\phi$) where $f_2$ is a constant frequency and $H_2$ is a proportionality constant; first and second phase shifting means having a plurality of output circuit means, the arrangement of these output circuit means being such that the phase relationship of the signals derived therefrom are determined by cos $n\alpha$ and sin $n\alpha$ respectively, where $n\alpha$ equals the angular spacing of a radiator from zero azimuth, said first and second phase shifting means being coupled to the first and second variable frequency generators for developing a first and second plurality of phase shifted signals, the phase relationship of the first plurality of phase shifted signals being determined by the relationship $f_1 \cos n\alpha+H_1 (\cos n\alpha \cos \theta \cos \phi)$, the phase relationship of the second plurality of phase shifted signals being determined by the relationship $f_2 \sin n\alpha+H_2 (\sin n\alpha \sin \theta \cos \phi)$; means coupled to the first and second fixed frequency generators and the first and second phase shifting means for developing a first and a second plurality of fixed frequency phase shifted signals having the same phase relationship as the first and second plurality of phase shifted signals respectively; first and second phase correction means in the signal path of the first and second fixed frequency phase shifted signals for modifying the phases of the fixed frequency phase shifted signals for removing the $f_1 \cos n\alpha$ and $f_2 \sin n\alpha$ contributions from the fixed frequency phase shifted signals; and means responsive to the first and second modified fixed frequency phase shifted signals for developing output signals, the phase relationship of which is a function of the first and second modified fixed frequency phase shifted signals.

12. A signal synthesizing system for an antenna having a circular array of angularly spaced radiators in a predetermined arrangement with respect to a three dimensional coordinate system, typically X, Y and Z axes, for controlling the direction of propagation of the array in the plane of the array, typically in azimuth $\theta$ comprising: first and second fixed frequency generating means; a first variable frequency generating means associated with an axis for developing a variable frequency signal, the frequency variation of which is determined by (a cosine function of $\theta$); a second variable frequency generating means associated with a second axis for developing variable frequency signals, the frequency variation of which is determined by (a sine function of $\theta$); first and second phase shifting means having a plurality of output circuit means, the arrangement of these output circuit means being such that the phase relationship of the signals derived therefrom are determined by a cosine function and a sine function of the angular spacing respectively, said first and second phase shifting means being coupled to the first and second variable frequency generators for developing a first and a second plurality of phase shifted signals, the phase relationships of the first plurality of phase shifted signals being determined by the relationship constant+(a cosine function of the angular spacing) (a cosine function of $\theta$), the phase relationship of the second plurality of phase shifted signals being determined by the relationship constant+(a sine function of the angular spacing) (a sine function of $\theta$); means coupled to the first and second fixed frequency generators and the first and second phase shifting means for developing a first and a second plurality of fixed frequency phase shifted signals having the same phase relationship as the first and second plurality of phase shifted signals respectively; first and second phase correction means in the signal path of the first and second fixed frequency phase shifted signals for modifying the phases of the fixed frequency phase shifted signals for removing the constant contribution to the phases of the first and second plurality of fixed frequency phase shifted signals; and means responsive to the first and second modified fixed frequency phase shifted signals for developing output signals, the phase relationship of which is a function of the first and second modified fixed frequency phase shifted signals.

References Cited in the file of this patent

UNITED STATES PATENTS

| | | |
|---|---|---|
| 2,245,660 | Feldman et al. | June 17, 1941 |
| 2,852,772 | Gitzendanner | Sept. 16, 1958 |
| 3,005,960 | Levenson | Oct. 24, 1961 |